United States Patent

Kitai et al.

[11] Patent Number: 5,788,882
[45] Date of Patent: *Aug. 4, 1998

[54] DOPED AMORPHOUS AND CRYSTALLINE ALKALINE EARTH GALLATES AS ELECTROLUMINESCENT MATERIALS

[75] Inventors: Adrian H. Kitai, 1265 Wilson Street, East, Hamilton, Canada, L8S 4K6; Tian Xiao, Hamilton, Canada

[73] Assignee: Adrian H. Kitai, Hamilton, Canada

[*] Notice: The term of this patent shall not extend beyond the expiration date of Pat. No. 5,725,801.

[21] Appl. No.: 789,330

[22] Filed: Jan. 23, 1997

Related U.S. Application Data

[63] Continuation-in-part of Ser. No. 674,842, Jul. 3, 1996, Pat. No. 5,725,801.

[51] Int. Cl.$^6$ .......................... C04B 35/00; C09K 11/80; C09K 11/55
[52] U.S. Cl. .......................... 252/301.4 R; 313/563; 313/509
[58] Field of Search .......................... 313/507, 509; 252/301.4 R

[56] References Cited

U.S. PATENT DOCUMENTS 2,457,054  12/1948  Leverenz et al. ............... 252/301.6 F

FOREIGN PATENT DOCUMENTS

| 0125731 | 11/1984 | European Pat. Off. |
| 0490621 | 6/1992 | European Pat. Off. |
| 490621 | 6/1992 | European Pat. Off. ......... 252/301.4 F |
| 48-43034 | 12/1973 | Japan. |
| 1579925 | 7/1990 | U.S.S.R. ............... 252/301.6 F |
| 1579926 | 7/1990 | U.S.S.R. ............... 252/301.6 F |

OTHER PUBLICATIONS

Herbert et al. "Luminescence of $Dy^{3+}$-Activated $\beta$-$Ga_2O_3$". Jour. Electrochem. Soc. vol. 115(1), pp. 104–105, Jan. 1968.
Poort et al. "Luminescence of Eu2+ in Barium and Strontium Aluminate and Gallate", Chemistry of Materials, Vo. 7, pp. 1547–1551, Jun. 2, 1995.
Compound Formation and $Mn^{2+}$-Activated Luminescence in the Binary Systems $R_2O$- and $RO$-$Ga_2)_3$*; C.W.W. Hoffman, United Sierra Divisin, Cypress Mines Corporation, 101 Oakland Avenue, Trenton, New Jersey and Jesse J. Brown, Department of Metals & Ceramic Engineering Virginia Polytechnic Institute, Blacksburg, Viriginia 24061; Sylvania Electric Products Inc. Chemical and Metallurgical Division, Towanda, Pennsylvania 18848; J. inorg. nucl.Chem 1968, vol. 30 pp. 63–79, no month no date.
J. Electrochem. Soc.: Solid State Science, Jan. 1968, Luminescence of $Dy^{3+}$-activated $\beta$-$Ga_2O_{3+}$, Willaim C. Herbert, Henry B. Minnier, and Jesse J. Brown, Chemical and Metallurgical Division, Sylvania Electric Products, Inc., Towanda, Pennsylvania, pp. 104–105. no month no date.

(List continued on next page.)

*Primary Examiner*—Melissa Bonner
*Attorney, Agent, or Firm*—Lynn C. Schumacher; Hill & Schumacher

[57] ABSTRACT

New phosphors based on doped alkaline earth gallates for electroluminescent (EL) display materials. Bright red EL has been obtained in amorphous and crystalline alkaline earth gallates doped with europium. Powder targets of nominal compositions $Sr_4Ga_2O_7$, $Sr_7Ga_4O_{13}$, $Sr_3Ga_2O_6$, $Sr_3Ga_4O_9$, $SrGa_4O_7$, $SrGa_{12}O_{19}$, $Ba_4Ga_2O_7$, $Ba_3Ga_2O_6$ and $Ca_3Ga_4O_9$ doped with 1–2% Eu, were RF magnetron sputtered onto $BaTiO_3$ substrates. Both annealed and as-deposited films yielded bright EL emission in the red part of the visible spectrum with peaks characteristic of the $Eu^{3+}$ ion.

31 Claims, 10 Drawing Sheets

OTHER PUBLICATIONS

Journal of Luminscence 40 & 41 (1988) 103–104, North–Holland, Amsterdam; Luminescence from $\beta\text{-}Ga_2O_3\text{:}Cr^{3+}$; C.G. Walsh, J.F. Doegan, T.J. Glynn, G.P. Morgan and G.F. Imbusch; Department of Physics, University College, Galway, Ieland, no month no date.

32.4/Minami 32.4: New High–Luminance TFEL Devices Using $AnGa_2O_4$ Phosphor Emitting Layers, T. Minami, S. Takata, Y. Kuroi, T. Maeno, Kanazawa Institute of Technology, Ishikawa, Japan; SID 95 Digest, pp. 724–727, no month no date.

Efficiency of $Dy^{3+}$–Activated Phosphors; J.L. Sommerdijk and A. Bril; Philips Research Laboratories, Eindhoven, Netherlands, J. Electrochem. Soc.: Solid–State Science and Technology, Jul. 1975, pp. 952–954.

Luminescent Materials by Humboldt W. Leverenz, Chemico–Physics Section, RCA Manufacturing Company, Camden, New Jersey and Frederick Seitz, Randal–Morgan Laboratory of Physics, University of Pennsylvania, Philadelphia, Pennsylvania, Journal of Applied Physics, vol. 10, Jul. 1939, pp. 479–493.

XP 000607881, Chem. Mater. 1995, 7, 1547–1551; Luminescence of $Eu^{2+}$ in Barium and Strontium Aluminate and Gallate; S.H.M. Poort, W.P. Blokpoel, and G. Blasse, Debye Institute, Utrecht University, P. O. Box 80 000 3508 TA Utrecht, The Netherlands, Revised Manuscript Received Jun. 2, 1995; 1995 American Chemical Soceity.

P–38 Electroluminescence of $Zn_2Sio_4\text{:}Mn$ Thin–Film Phosphor, A.H. Kitai, X. Ouyang, McMaster University, Hamilton, Ontario, Canada, SID 94 Digest, pp. 572–575, no date.

XP 000607440; Journal of Luminescence 11 (1976) 443–436; North–Holland Publishing Company, On the Luminescence of $\beta\text{-}Ga_2O_3\text{:}Dy^{3+}$; J. L. Sommerdijk, A.C. Van Amstel and F.M.J.H. Hoex–Strik, Philips Research Laboratories, Eindhoven, The Netherlands.

10.2: High–Luminance Green–Emitting EL Devices with a $Zn_2SiO_4\text{:}Mn$ Thin–Film Emitting Layer; T. Minami, T. Miyata, S. Takata, I. Fukuda, Kanazawa Institute of Technology, Ishikawa, Japan; SID 92, pp. 162–165, no date.

DOPED AMORPHOUS AND CRYSTALLINE ALKALINE EARTH GALLATES AS ELECTROLUMINESCENT MATERIALS

This application is a continuation-in-part application of U.S. patent application Ser. No. 08/674,842 filed on Jul. 3, 1996 entitled Doped Amorphous And Crystalline Gallium Oxides, Alkaline Earth Gallates And Doped Zinc Germanate Phosphors As Electroluminescent Materials, now U.S. Pat. No. 5,725,801.

FIELD OF THE INVENTION

The present invention relates to new phosphor materials exhibiting electroluminescence based on alkaline earth gallates doped with europium and methods for their production. More particularly, the invention relates to amorphous and crystalline alkaline earth gallate phosphors containing europium and methods for making these materials.

BACKGROUND OF THE INVENTION

Electroluminescence (EL) occurs by the emission of light from a phosphor in response to a sufficiently high electric field developed across the phosphor. Phosphor refers to those materials which emit light in response to the application of a field across the material. Thin film EL devices have a basic structure comprising a phosphor film or layer and one or two dielectric or insulating layers sandwiched between two electrodes. An example of such a structure comprises a metal layer acting as the lower electrode covered by a dielectric layer made from a ferroelectric ceramic. This layer is then coated with a phosphor layer and the final layer, deposited over the phosphor layer, is a transparent, conducting upper electrode made from indium tin oxide (ITO). Application of an effective voltage between the two electrodes produces the electric field. The role of the dielectric layer is to limit the electric current and power dissipation to prevent damaging the EL device.

There is strong commercial interest to achieve the full spectral range in electroluminescent phosphors for visible display application and in particular for making colour flat panel displays. Sulphide phosphors are well known as efficient light emitters in electroluminescence as discussed in T. Inoguchi, M. Takeda, Y. Kakihara, Y. Nakata, M. Yoshida, SID'74 Digest, p. 84–85, 1974. These include ZnS:Mn and SrS:Ce. A significant drawback to SrS is that it is moisture sensitive and is unstable especially when electrically driven. Known electroluminescent materials being studied include materials such as SrS:RE, see W. A. Barrow, R. E. Coovert, C. N. King, Digest 1984 SID International Symposium, Los Angeles, p. 249, SrGa$_2$S$_4$:RE and CaGa$_2$S$_4$:RE as disclosed in W. A. Barrow, R. C. Coovert, E. Dickey, C. N. King, C. Laakso, S. S. Sun, R. T Tuenge, R. Wentross, Digest 1993 SID International Symposium, Seattle, p. 761; W. Halverson, T. Parodos, P. Colter, Display Phosphors Conference, San Diego, Nov. 13–16, 1995, p.115; S. S. Sun, E. Dickey, R. Tuenge, R. Wentross, Display Phosphors Conference, San Diego, Nov.13–16, 1995, p.119; T. Yang, M. Chaichimansour, W. Park, B. K. Wagner, C. J. Summers, Display Phosphors Conference, San Diego, Nov. 13–16, 1995, p.123; and T. S. Moss, D. C. Smith, J. A. Samuels, R. C. Dye, Display Phosphors Conference, San Diego, Nov. 13–16, 1995, p.127. While these materials do achieve red, green and blue emission, the gallium based sulphides suffer from low brightness, difficulty of preparation and stability problems.

It has recently been demonstrated that in the gallate based family of materials, ZnGa$_2$O$_4$:Mn could achieve bright and stable electroluminescence, see T. Minami, S. Takata, Y. Kuroi, T. Maeno, Digest 1995 SID International Symposium, Orlando, p. 724; and T. Minami, Y. Kuroi, S. Takata, Display Phosphors Conference, San Diego, Nov. 13–16, 1995, p.91. They obtained good green emission (200 cd/m$^2$ at 60 Hz at up to 0.9 lm/w) but only obtained 0.5 cd/m$^2$ blue, and 11.0 cd/m$^2$ red at a drive frequency of 1000 Hz, which are not practical brightness values for blue and red emissions. They annealed these phosphor materials at 1020° C. in argon.

More recently, Minami et al. have doped ZnGa$_2$O$_4$ with chromium to generate a better red phosphor, claiming 120 cd/m$^2$ at 1000 Hz, as disclosed in T. Minami, Y. Kuroi, S. Takata, T. Miyata, presented at Asia Display'95, Hamamatsu, Oct. 16–18, 1995, p.821. However both the low brightness and the high annealing temperatures (approximately 1000° C.) prevent this material from being a useful phosphor.

Still more recently, Blasse et al examined a range of barium and strontium aluminate and gallate phosphors having the general formula of Ba$_{1-x}$Sr$_x$Al$_{2-y}$Ga$_y$O$_4$ (x=0, 0.5, 1 and y=0, 1, 2), and observed the green Eu$^{2+}$ photoluminescence, rather than the red Eu$^{3+}$ photoluminescence when y=0 and 1, as disclosed in S. H. M. Poort, W. P. Blokpoel, and G. Blasse, Chem. Mater., vol.7, p.1547 (1995).

As mentioned above, a major drawback to known oxide electroluminescent materials is the need for post deposition high temperature annealing (in the vicinity of 1000° C.) of the films to produce electroluminescent behaviour. This need for high temperature treatment results in severe restrictions in the choice of substrates with only a limited number being available for use under these conditions. High temperature annealing also increases the cost of producing EL films rapidly on a large scale. Another limitation of many sulphide electroluminescent materials is that they are restricted to emitting at particular wavelengths or in a relatively narrow wavelength range, such as yellow ZnS:Mn or blue-green SrS:Ce which are not ideal for color displays that require emission in the red, green and blue parts of the visible spectrum. Electroluminescent materials based on sulphides inherently suffer from chemical stability problems such as oxide formation (since oxides are generally thermodynamically more stable than sulphides) which changes the electronic properties of the material over time.

The classic EL phosphor, ZnS:Mn, is yellow and has a peak wavelength of 580 nm. However, while it may be filtered red and green, most of the light is lost because only about 10% of the light is passed through the red and green filters. Similarly, a drawback of SrS:Ce, which is green-blue, is that only about 10% of the light is passed through a blue filter.

In the rare-earth doped oxides, narrow peaks that are red, green or blue result from dopants Eu$^{3+}$ or Tb$^{3+}$ so that little or no light is generated at wavelengths that are positioned in the visible spectrum away from the desired red, green and blue wavelengths.

It would therefore be very advantageous to provide a method of producing new electroluminescent materials which can be deposited without the requirement for high temperature annealing. It would also be advantageous to provide new electroluminescent materials which emit red light without the need for filtering. More specifically it would be very advantageous to provide a red EL phosphor, which is brighter than known red EL phosphors.

It would also be advantageous to provide a method of producing new phosphors exhibiting EL that are chemically

3 stable and do not react appreciably with water or oxygen and provide stable EL performance in which the brightness is maintained substantially constant during operation.

SUMMARY OF THE INVENTION

It is an object of the present invention to provide new electroluminescent materials based on alkaline earth gallates which exhibit electroluminescent behaviour in the red portion of the electromagnetic spectrum useful in color electroluminescent flat panel displays. It is also an object of the present invention to provide a method of producing these new phosphor films which do not require post production high temperature annealing in order to achieve electroluminescent behaviour.

A significant commercial advantage of the present invention is that several new alkaline earth gallate based electroluminescent materials have been grown on substrates at low temperatures and excellent electroluminescent behaviour has been obtained without the need for high temperature annealing as is common in other known oxide phosphor systems. Therefore, a very significant advantage of the present invention is that these new electroluminescent materials can be deposited onto a wide variety of substrates not normally useable as substrates for those known oxide EL materials requiring high temperature annealing in order to exhibit electroluminescence.

The invention provides oxide phosphors containing Sr, Ga and Eu, in which the atomic ratio of Sr to Ga varies over the range 1:12 to 2:1, the atomic ratio of Eu to Sr varies over the range 0.001:1 to 0.1:1, the phosphor being characterized by red electroluminescence when an effective voltage is applied across the phosphor. The invention also provides oxide phosphors containing Ba, Ga and Eu, in which the atomic ratio of Ba to Ga varies over the range 1:2 to 4:1; the atomic ratio of Eu to Ba varies over the range 0.001:1 to 0.1:1, the phosphor being characterized by red electroluminescence when an effective voltage is applied across the phosphor. The invention also provides oxide phosphors containing Ca, Ga and Eu in which the atomic ratio of Ca to Ga varies over the range 1:4 to 2:1, the atomic ratio of Eu to Ca varies over the range 0.001:1 to 0.1:1, the phosphor being characterized by red electroluminescence when an effective voltage is applied across the phosphor.

In one aspect of the invention there is provided an electroluminescent red emitting phosphor having a formulation $Sr_{1-x}Eu_xGa_yO_z$, where x is in the range 0.001 to 0.1, y is from about 0.5 to about 12, and z is approximately 1+(3/2)y. In this aspect of the invention a prefered formulation of the phosphor is x in the range from about 0.01 to about 0.05 and y in the range from about 0.5 to about 12.

In another aspect of the invention there is provided an electroluminescent red emitting phosphor having a formulation $Ba_{1-x}Eu_xGa_yO_z$, where x is in the range from about 0.001 to about 0.1, y is from about 0.5 to about 4, and z is approximately 1+(3/2)y. In this aspect of the invention a preferred formulation comprises x in the range from about 0.01 to about 0.05, y is the range from about 0.5 to about 2.

The present invention provides an electroluminescent red emitting phosphor having a formulation $Ca_{1-x}Eu_xGa_yO_z$, where x is in the range from about 0.001 to about 0.1, y is from about 0.5 to about 4, and z is approximately equal to 1+(3l2)y. In this aspect of the invention a prefered formulation comprises x in the range from about 0.01 to about 0.05 and y is in the range from about 0.5 to about 4.

The present invention provides a method of making electroluminescent red emitting europium doped strontium,

4 calcium and barium gallate phosphors. The method comprises the steps of providing appropriate amounts of precursor materials containing europium, gallium oxide and one of strontium, barium and calcium and blending the precursor materials together to form a uniform mixture followed by firing the mixture at a suitable temperature for a suitable time to form phosphor powders having a formulation, in the case of strontium gallate, $Sr_{1-x}Eu_xGa_yO_z$, where x is in the range 0.001 to 0.1, y is from about 0.5 to about 12, and z is approximately 1+(3/2)y, in the case of barium gallate, a formulation $Ba_{1-x}Eu_xGa_yO_z$, where x is in the range from about 0.001 to about 0.1, y is from about 0.5 to about 4, and z is approximately 1+(3/2)y, and the case of the calcium gallate, a formulation $Ca_{1-x}Eu_xGa_yO_z$, where x is in the range from about 0.001 to about 0.1, y is from about 0.5 to about 4, and z is approximately equal to 1+(3/2)y.

The present invention provides an electroluminescent display device comprising a dielectric layer having a front surface, a back surface and a conducting electrode on the back surface thereof. The device includes an electroluminescent red emitting phosphor film having a formulation $Sr_{1-x}Eu_xGa_yO_z$, where x is in the range 0.001 to 0.1, y is from about 0.5 to about 12, and z is approximately 1+(3/2)y. The phosphor film is deposited onto the front surface of the dielectric layer. The device includes a substantially transparent electrode deposited onto a top surface of the phosphor and means for applying a voltage between the transparent electrode and the conducting electrode to develop a suitable electric field across the phosphor.

The present invention also provides an electroluminescent display device comprising a dielectric layer having a front surface, a back surface and a conducting electrode on the back surface thereof. Included is an electroluminescent red emitting phosphor film having a formulation $Ba_{1-x}Eu_xGa_yO_z$, where x is in the range from about 0.001 to about 0.1, y is from about 0.5 to about 4, and z is approximately 1+(3/2)y. The phosphor film is deposited onto the front surface of the dielectric layer. The device includes a substantially transparent electrode deposited onto a top surface of the phosphor and means for applying a voltage between the transparent electrode and the conducting electrode to develop a suitable electric field across the phosphor.

The present invention provides an electroluminescent display device comprising a dielectric layer having a front surface, a back surface and a conducting electrode on the back surface thereof. The device includes an electroluminescent red emitting phosphor film having a formulation $Ca_{1-x}Eu_xGa_yO_z$, where x is in the range from about 0.001 to about 0.1, y is from about 0.5 to about 4, and z is approximately equal to 1+(3/2)y. The phosphor film is deposited onto the front surface of said dielectric layer. A substantially transparent electrode deposited onto a top surface of the phosphor, means for applying a voltage between the transparent electrode and the conducting electrode to develop a suitable electric field across the phosphor.

BRIEF DESCRIPTION OF THE DRAWINGS

The new phosphor materials exhibiting electroluminescent behaviour forming the present invention will now be described, by way of example only, reference being had to the accompanying drawings, in which:

FIG. 2 is a plot of brightness and efficiency versus voltage at 60 Hz for EL phosphor films sputtered from

5

Figure 2:
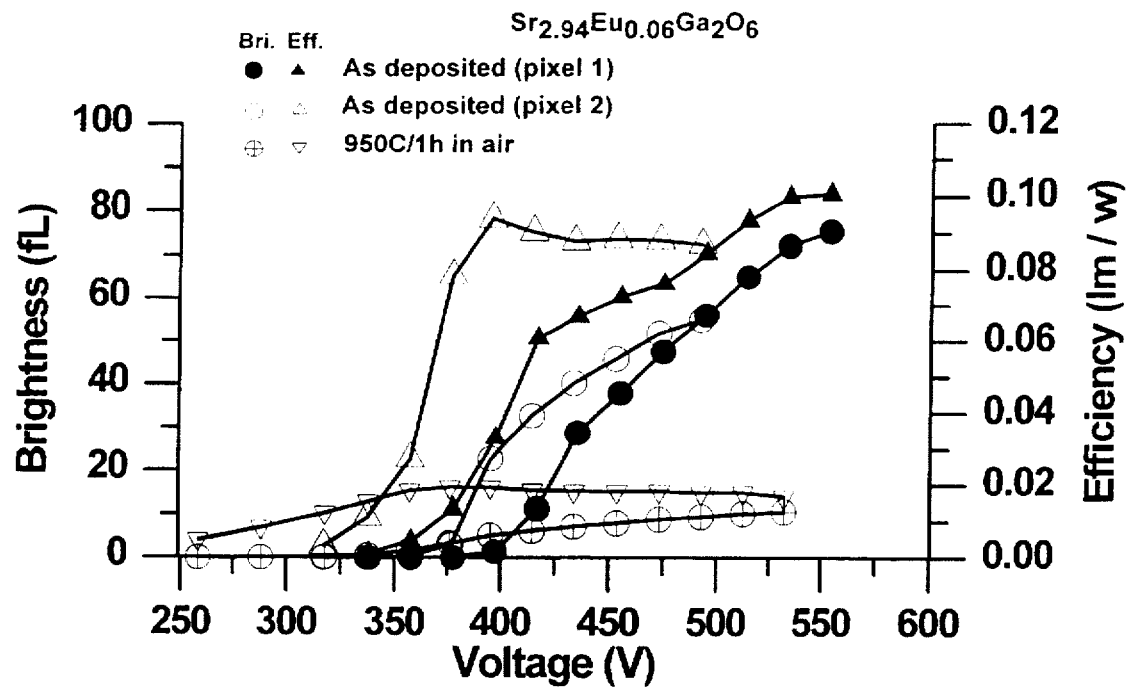
Figure 3:
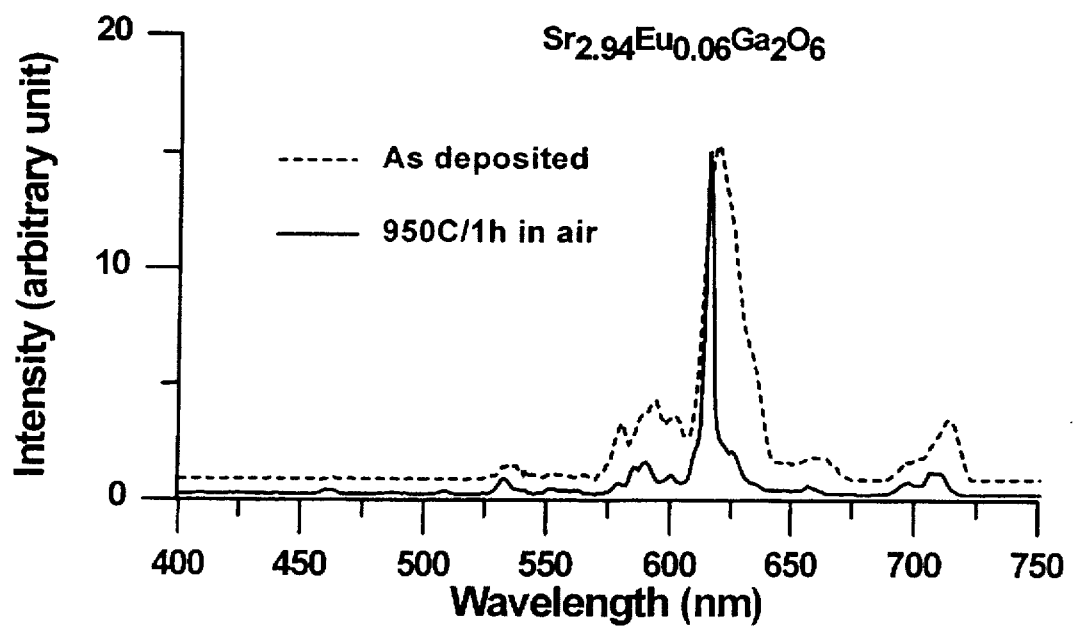
Figure 4:
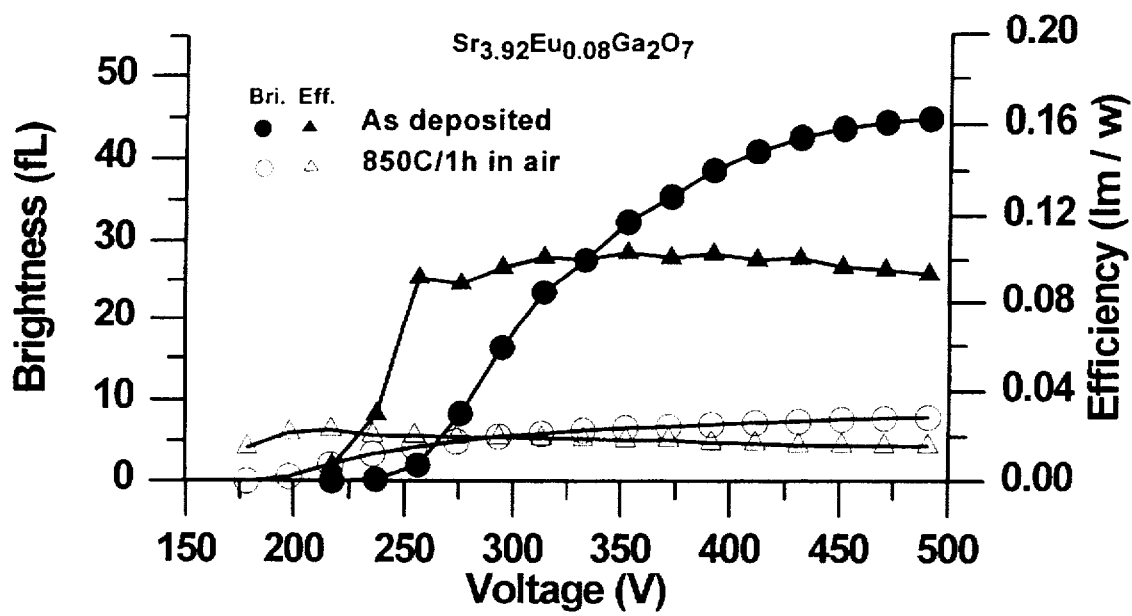
Figure 5:
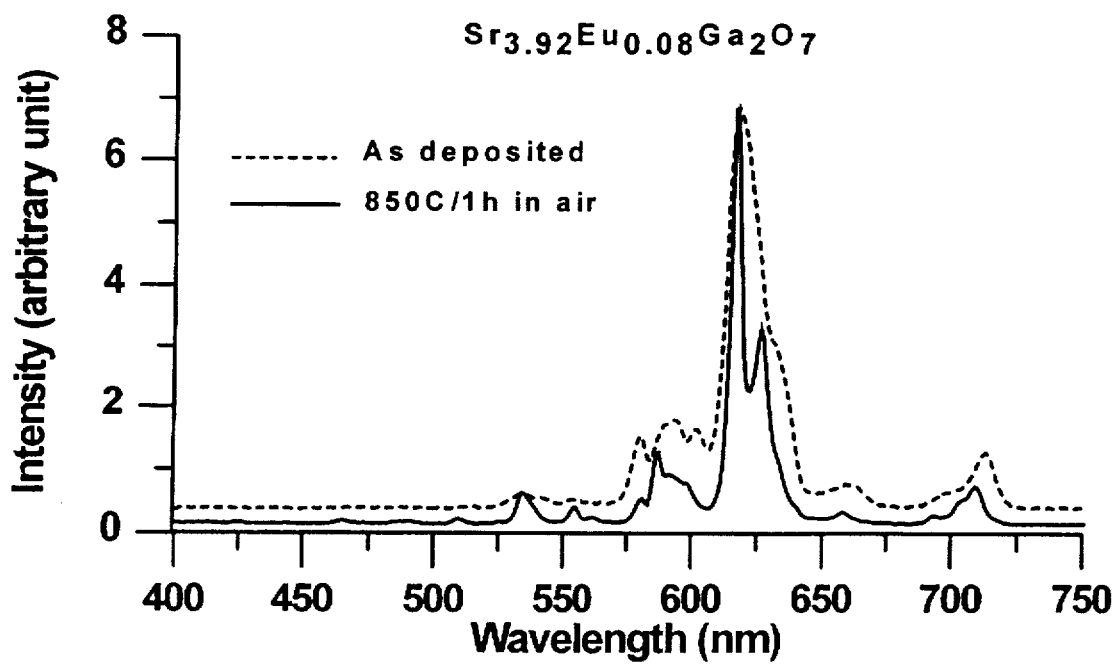
Figure 6:
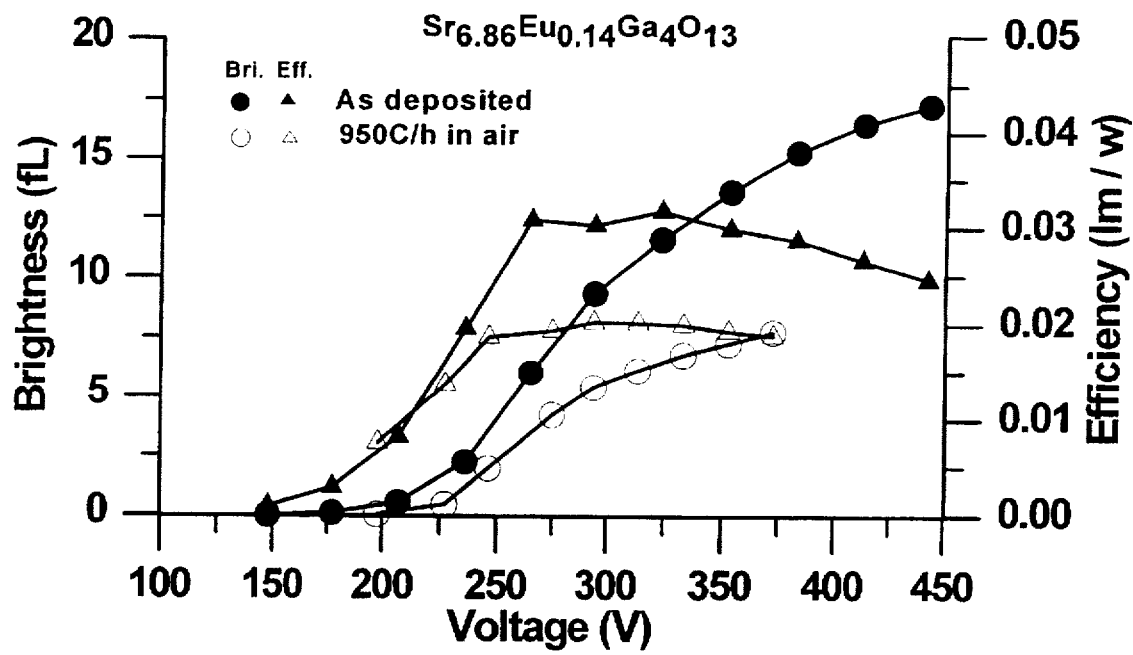
Figure 7:
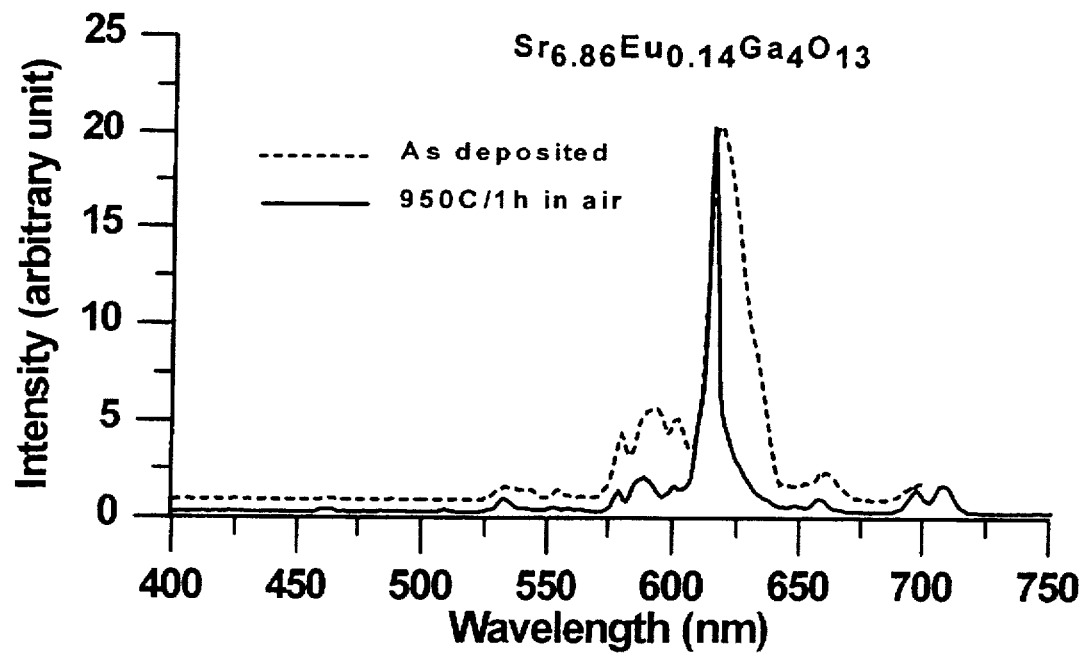
Figure 8:
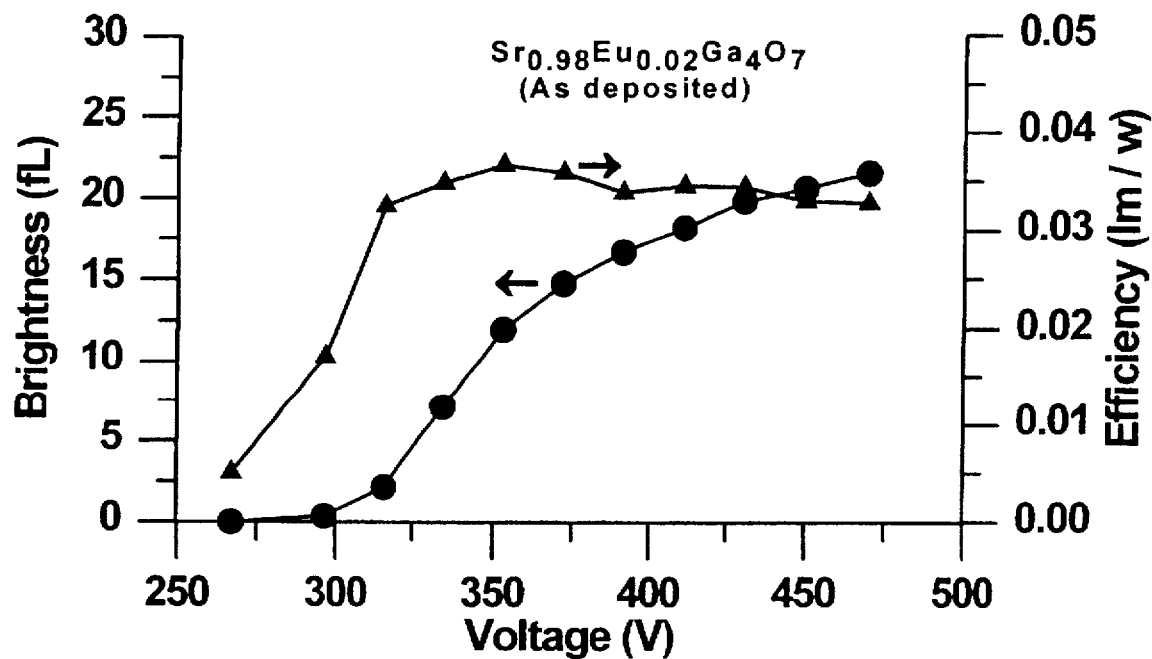
Figure 9:
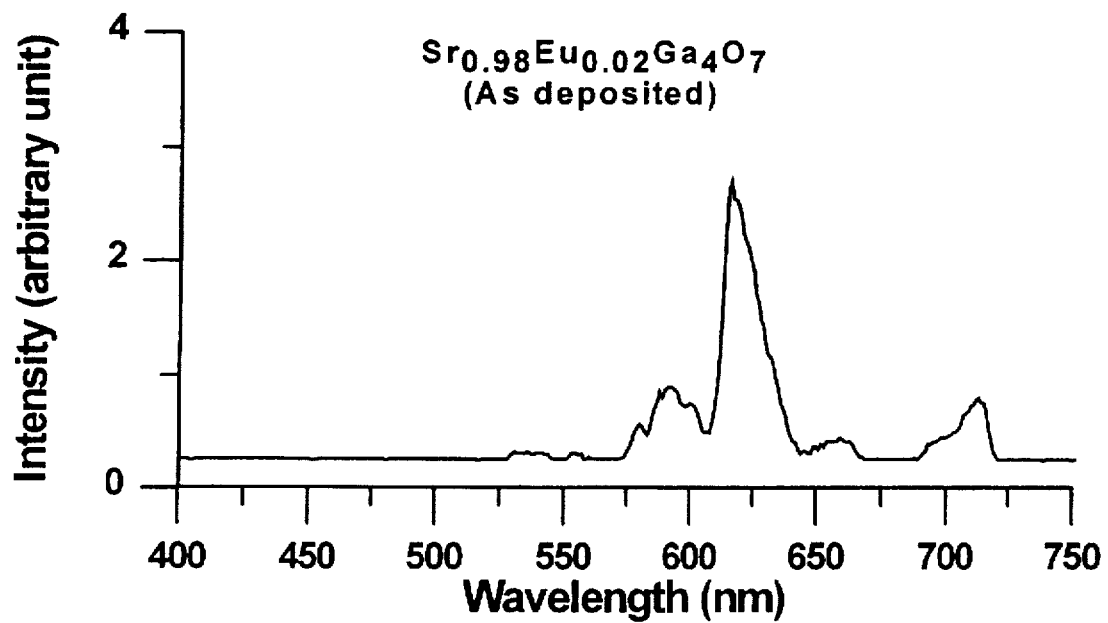
Figure 10:
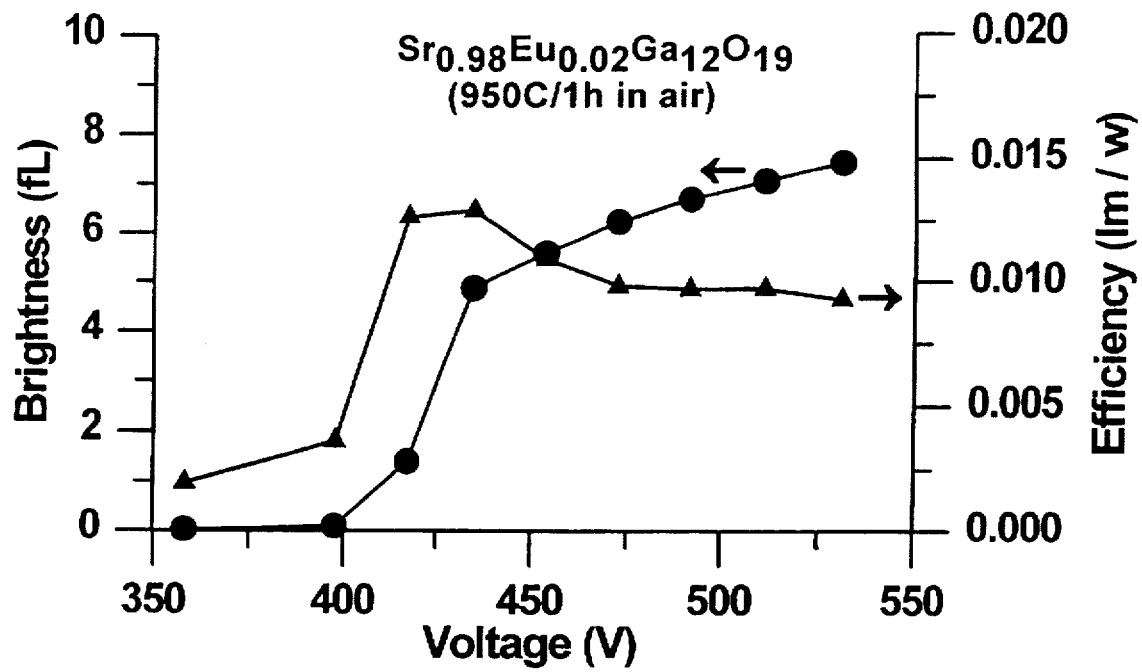
Figure 11:
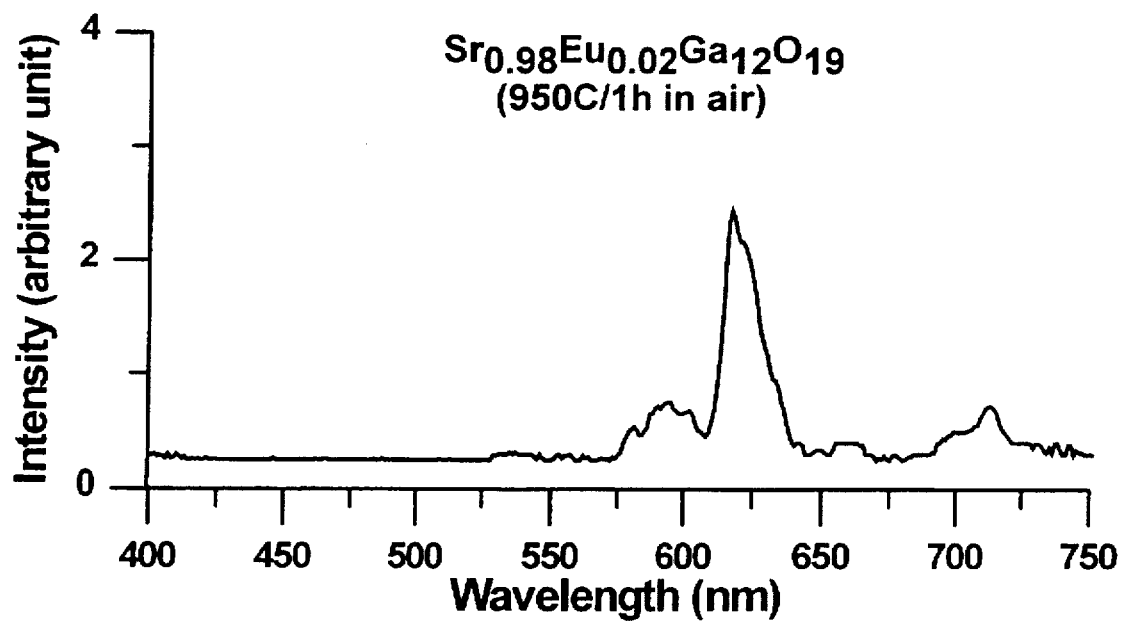
Figure 12:
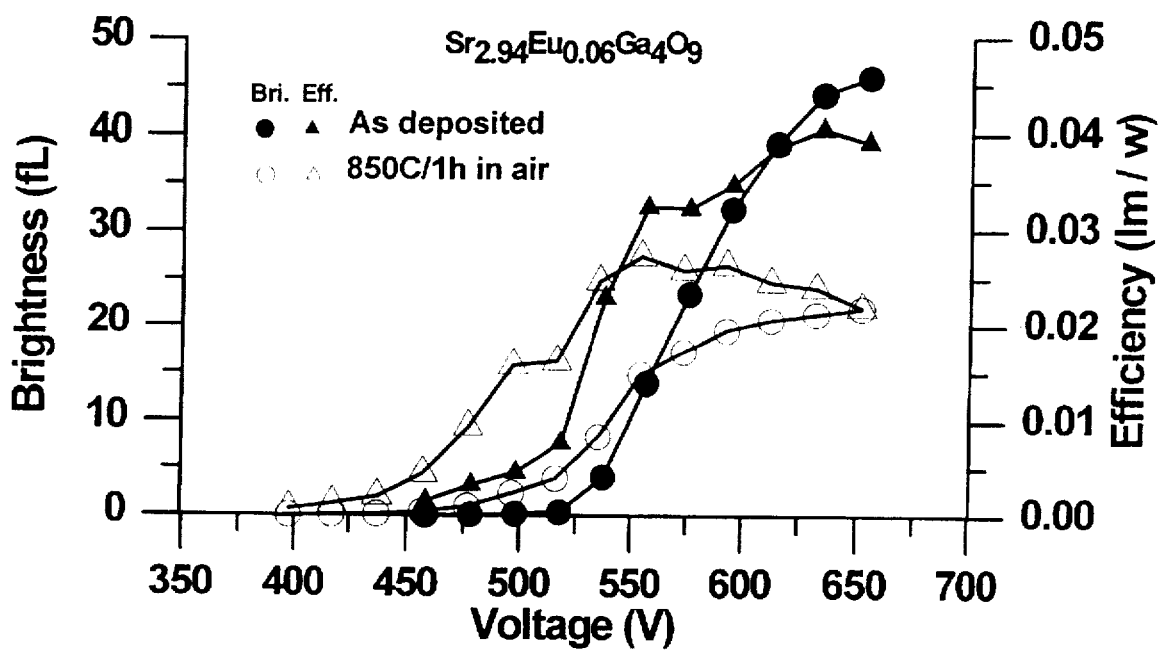
Figure 13:
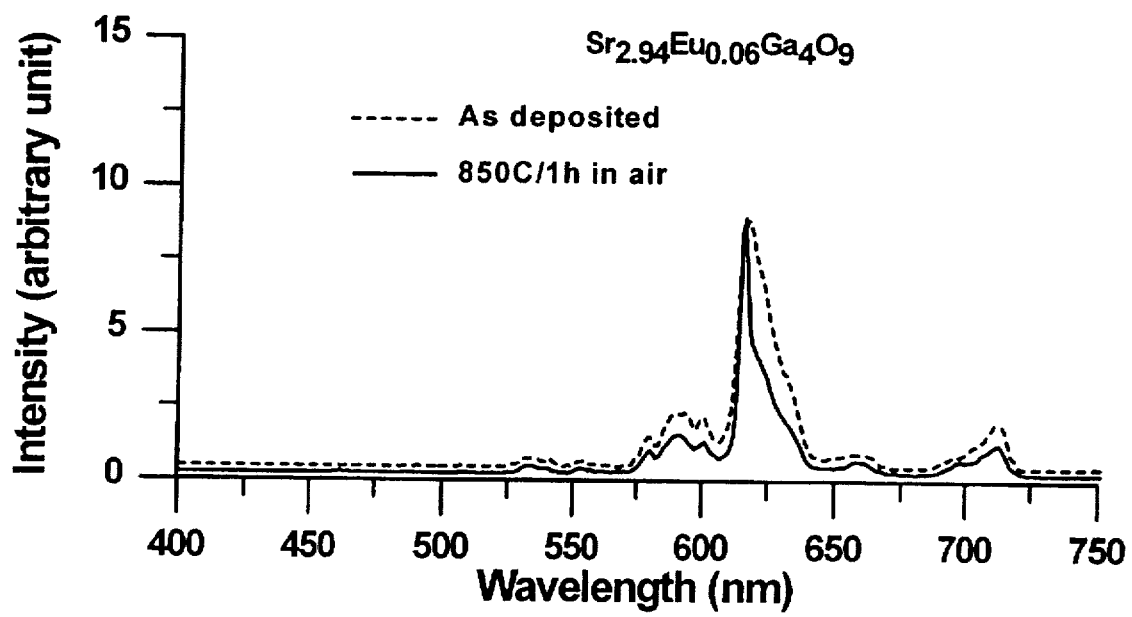
Figure 14:
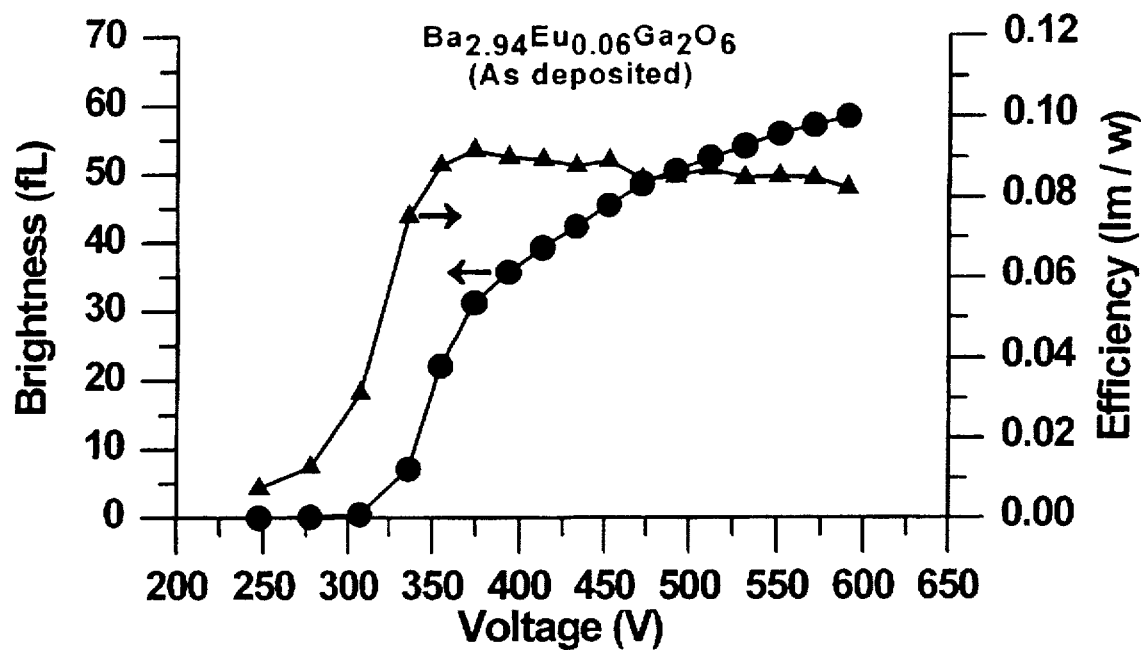
Figure 15:
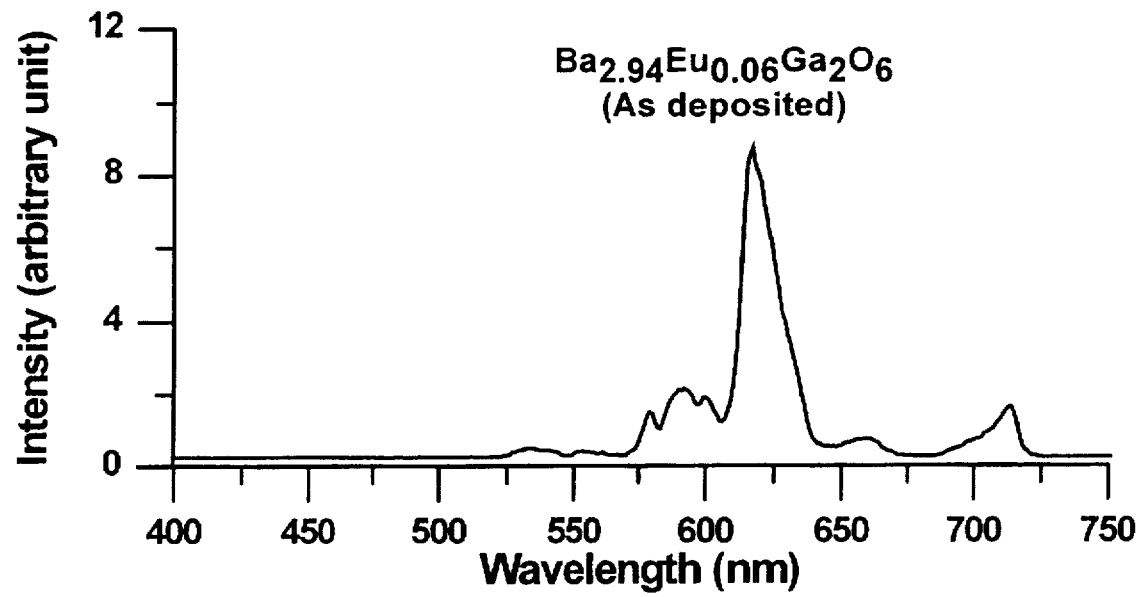
Figure 16:
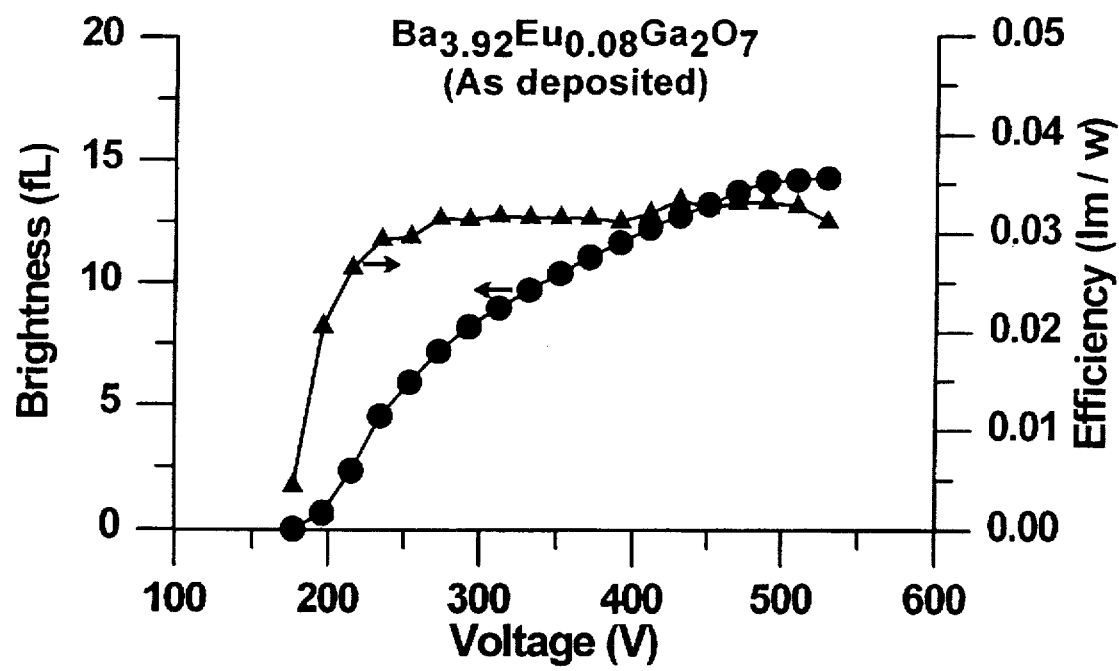
Figure 17:
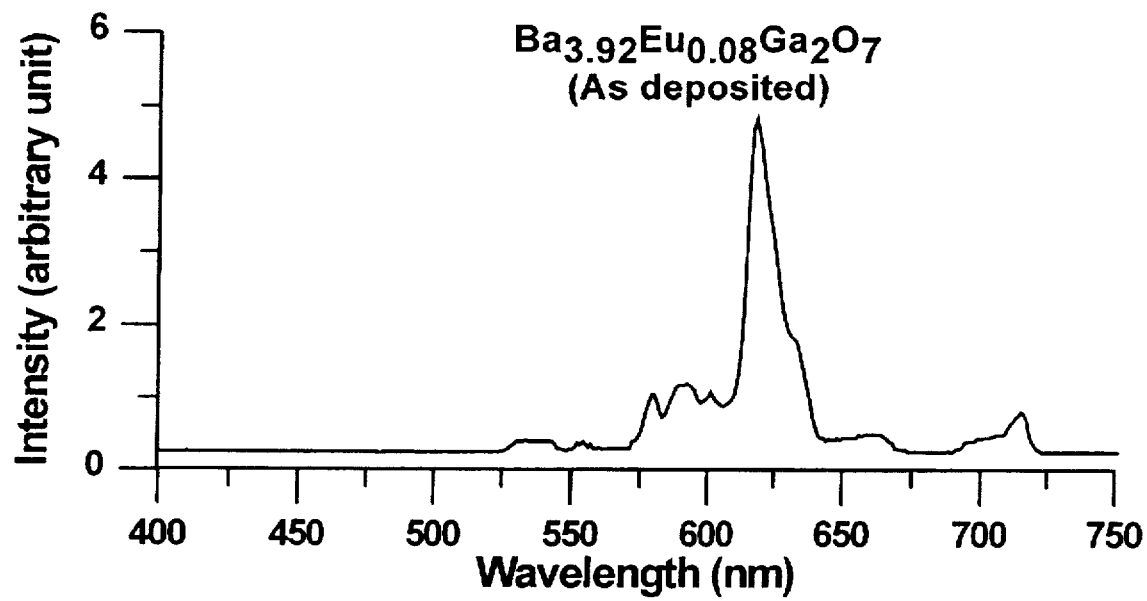
Figure 18:
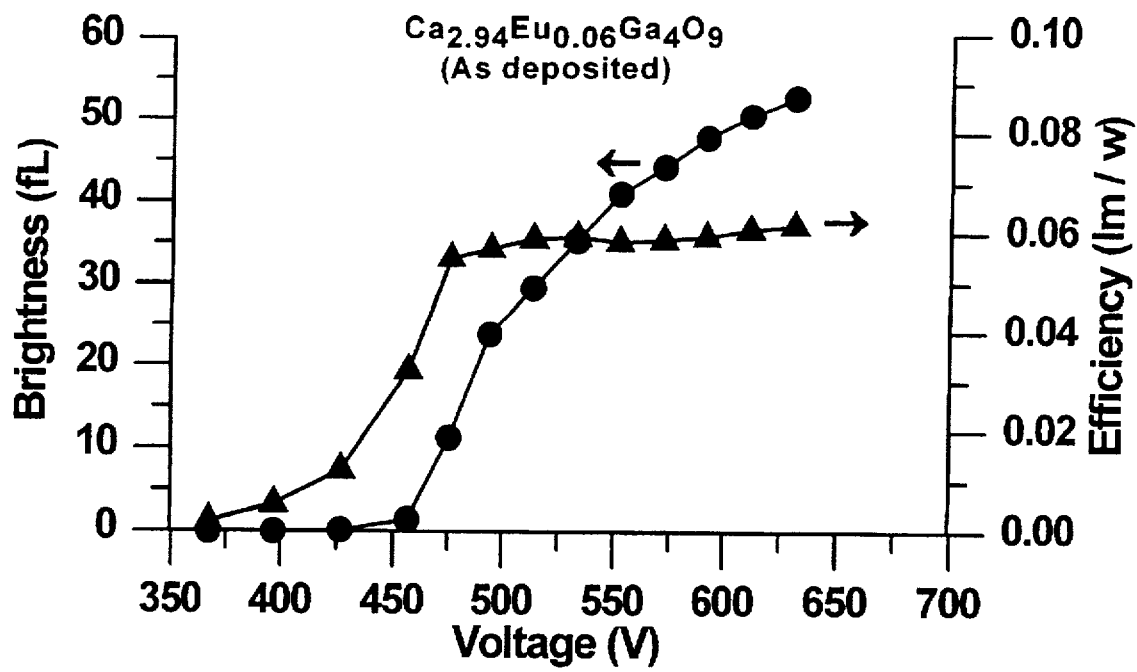
Figure 19:
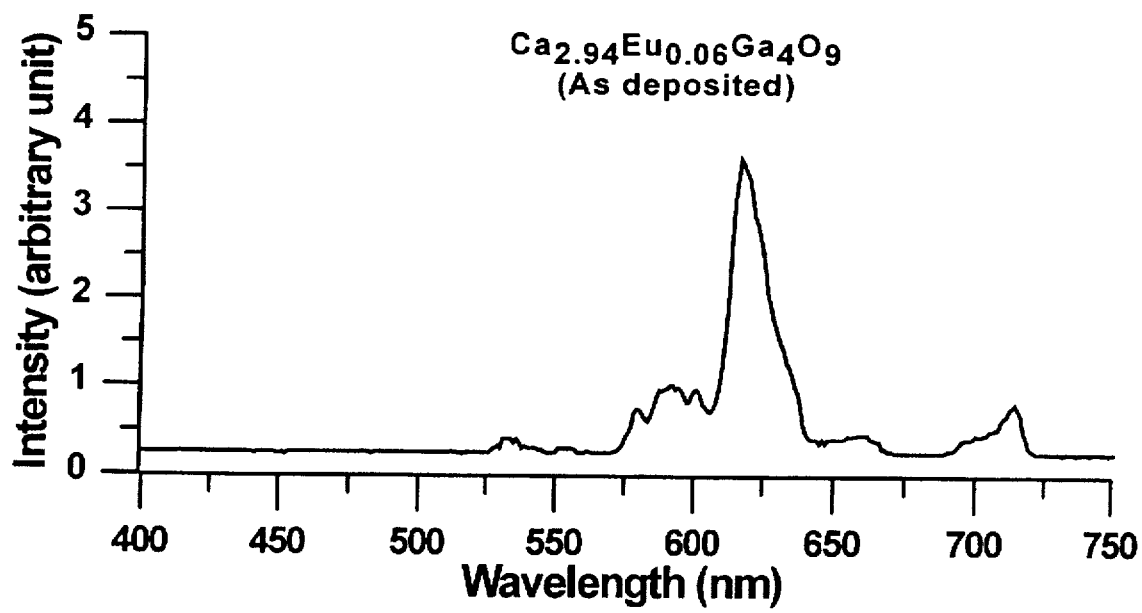

$Sr_{2.94}Eu_{0.06}Ga_2O_6$ onto an AVX substrate, both without an annealing step and with an anneal at 950° C. for 1 hour in air;

FIG. 3 shows the EL emission spectra for the phosphor films of FIG. 2;

FIG. 4 is a plot of brightness and efficiency versus voltage at 60 Hz for EL phosphor films sputtered from $Sr_{3.92}Eu_{0.08}Ga_2O_7$ onto an AVX substrate, both without an annealing step and with an anneal at 850° C. for 1 hour in air;

FIG. 5 shows the EL emission spectra for the phosphor films of FIG. 4;

FIG. 6 is a plot of brightness and efficiency versus voltage at 60 Hz for EL phosphor films sputtered from $Sr_{6.86}Eu_{0.14}Ga_4O_{13}$ onto an AVX substrate, both without an annealing step and with an anneal at 950° C. for 1 hour in air;

FIG. 7 shows the EL emission spectra for the phosphor films of FIG. 6;

FIG. 8 is a plot of brightness and efficiency versus voltage at 60 Hz for an EL phosphor film sputtered from $Sr_{0.98}Eu_{0.02}Ga_4O_7$ onto an AVX substrate, without an annealing step;

FIG. 9 shows the EL emission spectrum for the phosphor film of FIG. 8;

FIG. 10 is a plot of brightness and efficiency versus voltage at 60 Hz for an EL phosphor film sputtered from $Sr_{0.98}Eu_{0.02}Ga_{12}O_{19}$ onto an AVX substrate, with a subsequent anneal at 950° C. for 1 hour in air;

FIG. 11 shows the EL emission spectrum for the phosphor film of FIG. 10;

FIG. 12 is a plot of brightness and efficiency versus voltage at 60 Hz for EL phosphor films sputtered from $Sr_{2.94}Eu_{0.06}Ga_4O_9$ onto an AVX substrate, both without an annealing step and with an anneal at 850° C. for 1 hour in air;

FIG. 13 shows the EL emission spectra for the phosphor films of FIG. 12;

FIG. 14 is a plot of brightness and efficiency versus voltage at 60 Hz for an EL phosphor film sputtered from $Ba_{2.94}Eu_{0.06}Ga_2O_6$ onto an AVX substrate, without an annealing step;

FIG. 15 shows the EL emission spectrum for the phosphor film of FIG. 14;

FIG. 16 is a plot of brightness and efficiency versus voltage at 60 Hz for an EL phosphor film sputtered from $Ba_{3.92}Eu_{0.08}Ga_2O_7$ onto an AVX substrate, without an annealing step;

FIG. 17 shows the EL emission spectrum for the phosphor film of FIG. 16;

FIG. 18 is a plot of brightness and efficiency versus voltage at 60 Hz for an EL phosphor film sputtered from $Ca_{2.94}Eu_{0.06}Ga_4O_9$ onto an AVX substrate, without an annealing step; and FIG. 19 shows the EL emission spectrum for the phosphor film of FIG. 18.

DETAILED DESCRIPTION OF THE INVENTION

As used herein, the term phosphor(s) refers to substances or materials which exhibit electroluminescence (EL) when a suitable or effective electric field is developed across the material. The various elements used in the production of the new oxide based materials exhibiting EL disclosed herein include gallium (Ga), europium (Eu), strontium (Sr), barium (Ba) and calcium (Ca).

Film Preparation

Commercial high purity $SrCO_3$ (99.99%), $CaCO_3$ (99.95%), $BaCO_3$ (99.95%), $Ga_2O_3$ (99.999%) (from Alfa-Aesar), $Eu_2O_3$ (99.9%) (from Rhone-Poulenc) powders were mixed in appropriate ratios and fired at 1100° C. to 1250° C. in air for 2–46 hours to form the phosphor powders. The compositions of the phosphor compounds and their firing conditions are listed in Table 1. The phosphor powders were then ground, pressed, and placed in a 2-inch RF magnetron gun (US gun). Thin films were deposited on polished AVX $BaTiO_3$ substrates by RF magnetron sputtering using the phosphor powder targets. All substrates are a $BaTiO_3$-based ferroelectric ceramic made by green sheet processing (AVX Corp).

Figure 1:
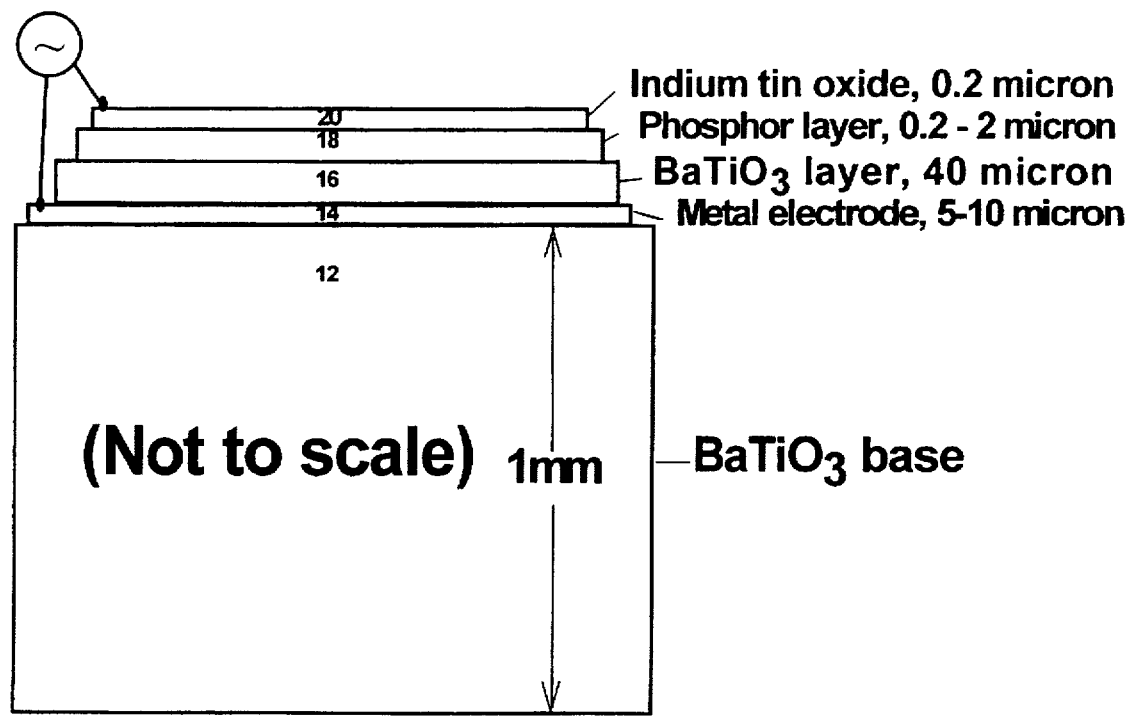
FIG. 1 is a side view of an EL device structure using a commercial barium titanate substrate produced by AVX Corp.

Referring to FIG. 1, a multi-layer thick film stack was manufactured to incorporate a $BaTiO_3$ underlayer 12, a screen-printed metal electrode 14 and finally a $BaTiO_3$ layer 16, 40 μm thick on the surface of electrode 14. Impurities that are commonly incorporated in the $BaTiO_3$ in industry allow the substrates to have the desired dielectric constant ($\epsilon_r$=9000), temperature dependence and other properties. The phosphor layer 18 was deposited by sputtering which was effected with a 2" US gun at a substrate temperature between 300°–350° C.

An AVX ceramic substrate, as shown in FIG. 1, was placed 4 cm above the gun. Sputtering was carried out at a gas pressure of 20 mtorr to grow thin films measuring 0.2 to 2 microns, preferably between 4000 Å and 9000 Å, in thickness. The sputtering atmosphere consists of 5% $O_2$ and 95% Ar. The thin films were annealed at between 850° C. and 950° C. for 1 hour in air or left unannealed, and a layer of ITO (indium tin oxide) of about 2000 Å was grown by RF magnetron sputtering at a substrate temperature of 350° C. to form a transparent top electrode. The completed device structure is shown in FIG. 1. The EL brightness was measured with a Minolta LS-100 Luminance Meter and efficiency was measured by the Sawyer-Tower method. EL emission spectra were measured with a computer controlled spectrometer.

Film Analysis

Since deviation in composition and structure generally occurs between the target and the thin film in sputter deposition of alkaline earth gallates, X-ray diffraction, X-ray flourescence analysis and elastic recoil backscattering compositional analysis were undertaken. X-ray diffraction and X-ray flourescence analysis was performed at McMaster University. Elastic recoil backscattering was performed at the Chalk River facility of Atomic Energy of Canada Limited using high energy Bi ions that strike the sample to be analysed. The atoms of which the sample is composed are physically ejected and their masses and hence the sample composition are determined.

Table 1 list s the analytical results for both the powder targets and the thin films sputtered from these targets and Table II is a summary of film composition analysis.

Results

A) Europium Doped Strontium Gallates

Red emitting phosphors having the formulation $Sr_{1-x}Eu_xGa_yO_z$, where x is the doping range of Eu and is in the range from about 0.001 to about 0.1, y is from about 0.5 to about 12, and z is approximately given by 1+(3/2)y were characterized by red electroluminescence when a suitable voltage was applied across the films. Films having preferred compositions with x in the range from about 0.01 to about 0.05 and y i n the range from about 0.5 to about 12 exhibited the highest efficiencies and brightnesses. The following non-limiting examples give the results of EL characterization of several europium doped strontium gallates formed by sputtering from captioned target materials produced in accordance with the present invention.

A1) $Sr_{2.95}Eu_{0.06}Ga_2O_6$

The EL brightness and efficiency versus applied voltage at 60 Hz for phosphor thin films sputtered from a $Sr_{2.94}Eu_{0.06}Ga_2O_6$ target are shown in FIG. 2, and the corresponding EL emission spectra are shown in FIG. 3. Much higher EL brightness and efficiency are achieved in the phosphor film without annealing than in the film annealed at 950° C. for 1 hour in air. Broader primary EL emission peak (centered at 618 nm) for the as deposited film, especially towards the longer wavelength as shown in FIG. 3, also makes its emission colour look deeper in red than the annealed film. X-ray diffraction only detected the $SrGa_2O_4$ phase in the 950° C. annealed film.

It is worth noting that the slope of the brightness-voltage curve (at above threshold) for the as-deposited phosphor film (1.0 fL/V for pixel 2 in FIG. 2) is about twice as steep as the best known oxide EL phosphor ($Zn_2SiO_4$:Mn on $BaTiO_3$), and is about as steep as the ZnS:Mn EL device, see for example, T. Xiao, G. Liu, M. Adams and A. H. Kitai, Can. J. Phys., vol. 74, p.132(1996).

A2) $Sr_{3.92}Eu_{0.08}Ga_2O_7$

The EL brightness and efficiency versus applied voltage at 60 Hz for phosphor thin films sputtered from a $Sr_{3.92}Eu_{0.08}Ga_2O_7$ target are shown in FIG. 4, and the corresponding EL emission spectra are shown in FIG. 5. Similarly, much higher EL brightness and efficiency, as well as a broader primary emission peak are achieved in the phosphor film without annealing than in the film annealed at 850° C. for 1 hour in air. X-ray diffraction again only detected $SrGa_2O_4$ phase in the 850° C. annealed film.

A3) $Sr_{6.86}Eu_{0.14}Ga_4O_{13}$

The EL brightness and efficiency versus applied voltage at 60 Hz for phosphor thin films sputtered from a $Sr_{6.86}Eu_{0.14}Ga_4O_{13}$ target are shown in FIG. 6, and the corresponding EL emission spectra are shown in FIG. 7. Again, much higher EL brightness and efficiency, as well as a broader primary emission peak are achieved in the phosphor film without annealing than in the film annealed at 950° C. for 1 hour in air. X-ray diffraction analysis, however, only detected $Sr_3Ga_4O_9$ phase in the films annealed at 950° C.

A4) $Sr_{0.98}Eu_{0.02}Ga_4O_7$

The EL brightness and efficiency versus applied voltage at 60 Hz for phosphor thin films sputtered from a $Sr_{0.98}Eu_{0.02}Ga_4O_7$ target are shown in FIG. 8, and the corresponding EL emission spectrum is shown in FIG. 9. Good EL is only achieved in the as deposited phosphor film in this case. X-ray diffraction analysis showed that the film crystallized into $SrGa_2O_4$ structure when annealed at 950° C. for 1 hour. However compositional analysis finds the actual Sr to Ga ratio to be 0.15 in the film, suggesting the possible presence of amorphous Ga-rich phases in the film which may require higher temperature to crystallize.

A5) $Sr_{0.98}Eu_{0.02}Ga_{12}O_{19}$

The EL brightness and efficiency versus applied voltage at 60 Hz for phosphor thin films sputtered from a $Sr_{0.98}Eu_{0.02}Ga_{12}O_{19}$ target are shown in FIG. 10, and the corresponding EL emission spectrum is shown in FIG. 11. Only moderate EL is achieved when the phosphor film is annealed at 950° C. for 1 hour in air. X-ray diffraction analysis detected a mixture of $SrGa_2O_4$ and $Ga_2O_3$ phases in the phosphor film annealed at 950° C.

A6) $Sr_{2.94}Eu_{0.06}Ga_4O_9$

The EL brightness and efficiency versus applied voltage at 60 Hz for phosphor thin films sputtered from a $Sr_{2.94}Eu_{0.06}Ga_4O_9$ target are shown in FIG. 12, and the corresponding EL emission spectra are shown in FIG. 13. Higher EL brightness and efficiency, as well as a broader primary emission peak are achieved in the phosphor film without annealing than in the film annealed at 850° C. for 1 hour in air. X-ray diffraction analysis detected $Sr_3Ga_4O_9$ phase in the 850° C. annealed film.

A7) $Sr_{0.89}Eu_{0.01}Ga_2O_4$

The films sputtered from targets with composition $Sr_{0.99}Eu_{0.01}Ga_2O_4$ achieved, after annealing at 850° C. for 1 hour in air, 20 fL (68 cd/m²) and exhibited a maximum efficiency of 0.03 lm/W. X-ray diffraction analysis suggested that the film crystallized into $SrGa_2O_4$ phase when annealed at 850° C. for 1 hour.

B) Europium Doped Barium Gallates

Phosphors having the formulation $Ba_{1-x}Eu_xGa_yO_z$, where x is in the range from about 0.001 to about 0.1, y is from about 0.5 to about 4, and z is approximately 1+(3/2)y, were characterized by red electroluminescence when a suitable voltage was applied across the films. Films having preferred compositions with x in the range from about 0.01 to about 0.05, y in the range from about 0.5 to about 2 exhibited the highest efficiencies and brightnesses. The following non-limiting examples give the results of EL characterization of several europium doped barium gallates formed by sputtering from captioned target materials produced in accordance with the present invention.

B1) $Ba_{2.94}Eu_{0.06}Ga_2O_6$

The EL brightness and efficiency versus applied voltage at 60 Hz for phosphor thin films sputtered from a $Ba_{2.94}Eu_{0.06}Ga_2O_6$ target are shown in FIG. 14, and the corresponding EL emission spectrum is shown in FIG. 15. Excellent EL is again achieved in the as deposited phosphor film in this case. X-ray diffraction analysis only detected $BaGa_2O_4$ phase in the films annealed at 950° C.

B2) $Ba_{3.92}Eu_{0.08}Ga_2O_7$

The EL brightness and efficiency versus applied voltage at 60 Hz for phosphor thin films sputtered from a $Ba_{3.92}Eu_{0.08}Ga_2O_7$ target are shown in FIG. 16, and the corresponding EL emission spectrum is shown in FIG. 17. Good EL is achieved in the as deposited phosphor film. X-ray diffraction analysis only detected the $BaGa_2O_4$ phase in the films annealed at 950° C.

B3) $Ba_{0.99}Eu_{0.01}Ga_2O_4$

The films sputtered from targets with composition $Ba_{0.99}Eu_{0.01}Ga_2O_4$ achieved, after annealing at 850° C. for 1 hour in air, 14 fL (48 cd/m2) and exhibited a maximum efficiency of 0.02 lm/W. X-ray diffraction analysis suggested that the thin film was amorphous after annealing at 850° C.

C) Europium Doped Calcium Gallates

Phosphors having the formulation $Ca_{1-x}Eu_xGa_yO_z$, where x is in the range from about 0.001 to about 0.1, y is from about 0.5 to about 4, and z is approximately equal to 1+(3/2)y were characterized by red electroluminescence when a suitable voltage was applied across the films. Films having preferred compositions with x in the range from about 0.01 to about 0.05 and y in the range from about 0.5 to about 4, exhibited the highest efficiencies and brightnesses. The following non-limiting examples gives the results of EL characterization of europium doped calcium gallate formed by atomic sputtering from captioned target materials produced in accordance with the present invention.

C1) $Ca_{2.94}Eu_{0.08}Ga_4O_9$

The EL brightness and efficiency versus applied voltage at 60 Hz for phosphor thin film sputtered from a $Ca_{2.94}Eu_{0.06}Ga_4O_9$ target are shown in FIG. 18, and the corresponding EL emission spectrum is shown in FIG. 19. Excellent EL is achieved only in the as deposited phosphor film in this case. X-ray diffraction analysis only detected $CaGa_2O_4$ (I) phase in the 950° C. annealed film.

C2)$Ca_{2.94}Eu_{0.06}Ga_2O_6$

The films sputtered from targets with composition $Ca_{2.94}Eu_{0.06}Ga_2O_6$ achieved, after annealing at 600° C. for 1 hour in air, 34 fL (116 cd/m$^2$) and exhibited a maximum efficiency of 0.095 lm/W. X-ray diffraction analysis showed that the film was amorphous after annealing at 600° C., and that it started to crystallize into $Ca_3Ga_2O_6$ (I) phase when annealed above 750° C. for 1 hour.

C3)$Ca_{0.89}Eu_{0.01}Ga_2O_4$

The films sputtered from targets with composition $Ca_{0.99}Eu_{0.01}Ga_2O_4$ achieved, after annealing at 950° C. for 1 hour in air, 22 fL (75 cd/m$^2$) and exhibited a maximum efficiency of 0.2 lm/W. X-ray diffraction analysis confirmed that the thin film crystallized into $CaGa_2O_4$ when annealed above 850° C. for 1 hour in air.

C4)$Ca_{0.99}Eu_{0.01}Ga4O_7$

The films sputtered from targets with composition $Ca_{0.99}Eu_{0.01}Ga_4O_7$ achieved, after annealing at 950° C. for 1 hour in air, 52 fL (177 cd/m$^2$) and exhibited a maximum efficiency of 0.042 lm/W. X-ray diffraction analysis showed that the film crystallized into $CaGa_4O_7$ phase when annealed above 850° C. for 1 hour.

Summarizing, new oxide phosphors based on doped alkaline earth gallates for electroluminescent display materials have been disclosed herein. Bright red electroluminescence has been obtained in amorphous and crystalline alkaline earth gallates doped with europium. Sintered powder targets of nominal compositions $Sr_4Ga_2O_7$, $Sr_7Ga_4O_{13}$, $Sr_3Ga_2O_6$, $Sr_3Ga_4O_9$, $SrGa_2O_4O_7$, $SrGa_{12}O_{19}$,$Ba_4Ga_2O_7$, $Ba_3Ga_2O_6$, $BaGa_2O_7$, and $Ca_3Ga_2O_6$, $Ca_3Ga_4O_9$, $CaGa_2O_4$, and $CaGa_4O_7$, doped with 1–2 mole% of Eu, were RF magnetron sputtered onto $BaTiO_3$-based ceramic dielectric substrates. Both annealed and as-deposited material, after coating with a transparent conductor layer of indium tin oxide (ITO), yielded bright electroluminescent (EL) emission predominantly in the red part of the visible spectrum with peaks characteristic of the $Eu^{3+}$ ion.

The films obtained from targets with composition $Sr_{3.92}Eu_{0.08}Ga_2O_7$ achieved, as deposited, 45 fL (153 cd/m$^2$) at 60 Hz and had a maximum efficiency of 0.1 lm/w; these films annealed at 850° C. for 1 hour in air achieved 8 fL (27cd/m$^2$) with maximum efficiency of 0.02 lm/w. The films obtained from targets with composition $Sr_{6.86}Eu_{0.14}Ga_4O_{13}$ achieved, as deposited, 17 fL (58 cd/m$^2$) and had a maximum efficiency of 0.03 lm/w; these films annealed at 950° C. for 1 hour in air achieved 7.7 fL (26 cd/m$^2$) with maximum efficiency of 0.02 lm/w. The films obtained from targets with composition $Sr_{2.94}Eu_{0.06}Ga_2O_6$ achieved, as deposited, 76 fL (258 cd/m$^2$) and had a maximum efficiency of 0.1 lm/w; these films annealed at 950° C. for 1 hour in air achieved 11 fL (37 cd/m$^2$) with a maximum efficiency of 0.02 lm/w. The films obtained from targets with composition $Sr_{2.94}.Eu_{0.06}Ga_4O_9$ achieved, as deposited, 46 fL (156 cd/m$^2$) and had a maximum efficiency of 0.04 lm/w; these films annealed at 850° C. for 1 hour in air achieved 22 fL (75 cd/m$^2$) with a maximum efficiency of 0.027 lm/w. The films obtained from targets with composition $Sr_{0.99}Eu_{0.01}Ga_2O_4$ achieved, after annealing at 850° C. for 1 hour in air, 20 fL (68 cd/m$^2$) and had a maximum efficiency of 0.03 lm/w. The films obtained from targets with composition $Sr_{0.98}Eu_{0.02}Ga_4O_7$ achieved, as deposited, 22 fL (75 cd/m$^2$) and had a maximum efficiency of 0.037 lm/w. The films obtained from targets with composition $Sr_{0.98}Eu_{0.02}Ga_{12}O_{19}$ achieved, after annealing at 950° C. for 1 hour in air, 7.4 fL (25 cd/m$^2$) and had a maximum efficiency of 0.013 lm/w. The films obtained from targets with composition $Ba_{3.92}Eu_{0.08}Ga_2O_7$ achieved, as deposited, 14 fL (48 cd/m$^2$) at 60 Hz and had a maximum efficiency of 0.033 lm/w. The films obtained from targets with composition $Ba_{2.94}Eu_{0.06}Ga_2O_6$ achieved, as deposited, 58 fL (198 cd/m$^2$) and had a maximum efficiency of 0.09 lm/w. The films obtained from targets with composition $Ba_{0.99}Eu_{0.01}Ga_2O_4$ achieved, after annealing at 850° C. for 1 hour in air, 14 fL (48 cd/m$^2$) and had a maximum efficiency of 0.02 lm/w. The films obtained from targets with composition $Ca_{2.94}Eu_{0.06}Ga_2O_6$ achieved, after annealing at 600° C. for 1 hour in air, 34 fL (116 cd/m$^2$) and had a maximum efficiency of 0.095 lm/w. The films obtained from targets with composition $Ca_{2.94}Eu_{0.06}Ga_4O_9$ achieved, as deposited, 52 fL (177 cd/m$^2$) and had a maximum efficiency of 0.06 lm/w. The films obtained from targets with composition $Ca_{0.99}Eu_{0.01}Ga_2O_4$ achieved, after annealing at 950° C. for 1 hour in air, 22 fL (75 cd/m$^2$) and had a maximum efficiency of 0.2 ml/w. The films obtained from targets with composition $Ca_{0.99}Eu_{0.01}Ga_4O_7$ achieved, after annealing at 950° C. for 1 hour in air, 52 fL (177 cd/m$^2$) and had a maximum efficiency of 0.042 lm/w.

Studies of the optical properties of the thin films of alkaline earth gallates disclosed herein show that both as-deposited films and annealed films were substantially transparent to visible light, which is a necessary condition for good light emission from an EL phosphor.

Conductivity studies showed that the thin alkaline earth gallate films are substantially electrically insulating when a voltage below the threshold value required for EL emission is applied across the film. This is a necessary condition for good performance of an EL phosphor. More specifically, there is a very small electrical conductivity associated with the phosphor thin film and it has been observed that those films having the lowest conductivity (and therefore being the best insulators) generally provide the brightest EL emission and have the sharpest turn-on characteristics. The turn-on sharpness is defined by the slope of the curve on the plot of brightness vs. voltage for a given thin film phosphor. It is well known to those skilled in the art of EL phosphors that it is generally desirable to achieve as sharp a turn-on characteristic as possible for an EL phosphor, particularly for flat panel display applications.

It will be appreciated that while the fabrication of the new electroluminescent phosphors disclosed herein has been described using sputtering as the film preparation method, other methods known to those skilled in the art may be used. Other methods of fabrication include electron beam deposition, laser ablation, chemical vapor deposition, vacuum evaporation, molecular beam epitaxy, sol gel deposition and plasma enhanced vacuum evaporation to mention a few. In addition, the new phosphor materials disclosed herein may also be fabricated as phosphor powders and used in powder EL applications.

Various thin film dielectrics used in electroluminescent applications include $SiO_2$, SiON, $Al_2O_3$, $BaTiO_3$, $BaTa_2O_6$, $SrTiO_3$, $PbTiO_3$, $PbNb_2O_6$, $Sm_2O_3$, $Ta_2O_5$—$TiO_2$, $Y_2O_3$, $Si_3N_4$, SiAlON. These may be used as substrates in the present invention by depositing onto glass, silicon or quartz substrates, to mention just a few.

Thick film dielectrics on ceramic substrates may also be used. While the results disclosed herein were obtained using $BaTiO_3$ thick film dielectrics, other thick films on ceramic substrates may also be used. The ceramic substrate may be alumina ($Al_2O_3$) or the same ceramic as the thick film itself. Thick dielectric films of $BaTiO_3$, $SrTiO_3$, $PbZrO_3$, $PbTiO_3$, to mention just a few, may also be used.

Variations of the EL laminate device configuration will be readily apparent to those skilled in the art. An alumina substrate may be used onto which the lower conductive electrode is deposited followed by the high dielectric constant material, the phosphor and then the outer transparent electrode. Alternatively, a conductive electrode contact may be deposited onto the back of a thick, rigid dielectric substrate material onto the front of which the phosphor layer is deposited followed by the outer transparent conductive electrode.

Discussion

Three key observations made during characterization of the new EL phosphor materials indicate that no one particular distinct material composition or crystal structure is a prerequisite for obtaining EL behavior. i) The fact that EL emission occurs in a variety of Eu-doped crystalline alkaline earth gallates is one strong indication that EL emission is not critically dependent upon a precise arrangement of the atoms and hence is not limited to a specific crystal structure, or a specific ratio of Ga to Ca, Sr, or Ba. In addition, the fact that EL emission occurs in certain strontium and calcium gallates which are not annealed after deposition (thereby avoiding crystallization) also strongly indicates that EL emission is not critically dependent upon a precise arrangement of the atoms and hence is not limited to a specific crystal structure. This is illustrated by results from targets of nominal composition $Sr_4Ga_2O_7$, $Sr_7Ga_4O_{13}$, $Sr_3Ga_2O_6$, $Sr_3Ga_4O_9$, $SrGa_4O_7$, $Ba_4Ga_2O_7$, $Ba_3.Ga_2O_6$, $Ca_3Ga_2O_6$ and $Ca_3Ga_4O_9$ (all doped with 2% Eu). Noteworthy is the observation that bright and efficient EL is obtained from these as sputtered, non-crystallized films whose EL performance was significantly reduced upon high temperature annealing above 850° C.

Known phases of strontium gallates, calcium gallates and barium gallates are presented in the literature, see for example V. P. Kobzareva, L. M. Kovba, L. M. Lopato, L. N. Lykova and A. V. Shevchenko, Russ. J. Inorg. Chem., vol.21, p.903 (1976); L. M. Kovba, L. N. Lykova and T. A. Kalinina, Russ. J. lnorg. Chem., vol.25, p.397 (1980); and C. W. W. Hoffman and Jesse J. Brown, J. Inorg. Nucl. Chem., vol.30, p.63 (1968). The stoichiometric compositions of the powder targets are based on these reported phases.

ii) While sputtering has been disclosed herein as a best mode for producing the phosphor films those skilled in the art will appreciate that during sputtering the composition of the sputtered film may deviate from the composition of the source material forming the sputtering target, as observed from the chemical analysis studies in Table II. Some materials show greater deviation than others, for example the composition of the phosphor film formed by sputtering from the $Ca_{2.94}Eu_{0.06}Ga_2O_6$ target showed a much more significant variation in Ca than for example the film sputtered from the $Ca_{0.99}Eu_{0.01}Ga_2O_4$ target. These results suggest that the alkaline earth metal contents tend to be lower (in varying degrees in the Sr and Ca cases) or about the same (in the Ba case) in the thin films as compared to the targets. The actual deviation varies from compound to compound. This occurs due to a difference in sticking coefficients between the different elements being sputtered; a difference in the sputtering yields between the elements of the target; and incorporation of chemical elements in the sputtering gas into the thin film that are not initially present in the sputtering target. The deviation in stoichiometry between the target material and the sputtered film is another strong indicator that EL emission is not critically dependent upon a specific or unique ratio of Ga to Ca, Sr or Ba.

iii) Another observation which was made by elastic recoil backscattering analysis of the sputtered films is that there is a gradient in composition through the strontium gallate films: the first-to-grow layers have a higher gallium to strontium ratio, and the last-to-grow layers have a lower gallium to strontium ratio. This is thought to be caused by depletion of gallium in the target as the film growth proceeds (evidenced by gallium-rich thin films) which increases the strontium concentration at the target surface during film growth. This gradient in concentration also strongly supports the view that EL behavior may be obtained in films exhibiting variations in stoichiometry.

The EL characteristics of the phosphors may vary within the solubility range of the dopant(s) in the host lattice. Electronic interactions between dopant ions can play a role in determining the prefered concentration of dopant ions for maximum brightness and efficiency. This phenomenon, known as concentration quenching, results in decreasing brightness and efficiency for doping concentrations beyond a certain point within the solubility limit such that there will be preferred dopant concentrations which give optimum EL properties.

Therefore, It is to be understood that the nomenclature or notation used herein to identify the new phosphor materials is not to be interpreted as limiting. For example, it is not necessarily the case that the rare earth dopant (Eu) substitutes for Ca, Sr or Ba in the host lattice. It will also be appreciated by those skilled in the art that the allowable ranges of concentration of dopants in the different new phosphor materials disclosed herein will depend in part on the solubility limit of the dopant in the oxides.

Table I gives the thin film annealig temperatures at which crystallization of the films was studied, with the exception of $BaGa_2O_4$. These temperatures, however, were not chosen to optimize EL brightness and efficiency. Optimum annealing, if necessary at all, will depend on the thin film composition.

In view of the foregoing, it will be understood that the present invention encompasses those europium doped alkaline earth gallate phosphors exhibiting EL behavior defined by the ranges disclosed herein and that this EL behavior has been observed for a range of compositions and film microstructures from amorphous to crystalline.

TABLE 1

PHOSPHOR PREPARATION AND ANALYSIS

| Nominal Composition | Powder Synthesis | Powder Phase(s) identified | Thin Film Annealing | Thin Film Phase(s) | Sr/Ga (Ca/Ga) <Ba/Ga> Nominal | Thin Film |
|---|---|---|---|---|---|---|
| $Sr_4Ga_2O_7$ | 1100° C./20 h | $Sr_4Ga_2O_2 + SrGa_2O_4$ | 850° C./1 h | $SrGa_2O_4$ | 2 | |
| $Sr_7Ga_4O_{13}$ | 1100° C./46 h | $Sr_4Ga_2O_7 + Sr_3Ga_2O_6$ | 950° C./1 h | $Sr_3Ga_4O_9$ | 1.75 | |
| $Sr_3Ga_2O_6$ | 1100° C./20 h | $Sr_4Ga_2O_7 + Sr_3Ga_2O_6$ | 950° C./1 h | $SrGa_2O_4$ | 1.5 | |
| $Sr_3Ga_4O_9$ | 1100° C./26 h | $Sr_3Ga_4O_2$ | 850° C./1 h | $Sr_3Ga_4O_8$ | 0.75 | 0.55 |
| $SrGa_2O_4$ | 1100° C./26 h | $SrGa_2O_4$ | 950° C./1 h | $SrGa_2O_4$ | 0.5 | 0.39 |
| $SrGa_4O_7$ | 1100° C./20 h | $SrGa_4O_7$ | 950° C./1 h | $SrGa_2O_4$ | 0.25 | 0.15 |
| $SrGa_{12}O_{19}$ | 1100° C./46 h | $SrGa_{12}O_{19} + Ga_2O_3$ | 950° C./1 h | $SrGa_2O_4 + Ga_2O_3$ | 0.083 | |
| $Ca_3Ga_2O_6$ | 1100° C./7.5 h | $Ca_3Ga_2O_6$ | 750° C./1 h | $Ca_3Ga_2O_6$ | (1.5) | (0.84) |
| $Ca_3Ga_4O_9$ | 1100° C./12 h | $Ca_3Ga_4O_8$ | 950° C./1 h | $CaGa_2O_4(I)$ | (0.75) | |
| $CaGa_2O_4$ | 1100° C./2 h | $CaGa_2O_4(I,II)$ | 850° C./1 h | $CaGa_2O_4(I)$ | (0.5) | (0.49) |
| $CaGa_4O_7$ | 1100° C./12 h | $CaGa_4O_7$ | 850° C./1 h | $CaGa_4O_7$ | (0.25) | |
| $Ba_4Ga_2O_7$ | 1100° C./20 h | $Ba_4Ga_2O_7 + Ba_3Ga_2O_6$ | 950° C./1 h | $BaGa_2O_4$ | <2> | |
| $Ba_3Ga_2O_6$ | 1100° C./20 h | $Ba_3Ga_2O_6$ | 950° C./1 h | $BaGa_2O_4$ | <1.5> | |
| $BaGa_2O_4$ | 1250° C./12 h | $BaGa_2O_4$ | 850° C./1 h | Amorphous | <0.5> | <0.54> |

TABLE II

SUMMARY OF FILM COMPOSITION ANALYSIS

| Target Composition | Method of Analysis | Thin Film Composition |
|---|---|---|
| $Sr_{2.88}Tb_{0.12}Ga_4O_9$ | Elastic Recoil | $Sr_{22}(Tb)_xGa_4O_9$ |
| $Sr_{0.92}Tb_{0.08}Ga_2O_4$ | Elastic Recoil | $Sr_{0.78}(Tb)_xGa_2O_4$ |
| $Sr_{0.92}Tb_{0.08}Ga_2O_4$ | X-ray fluorescence | $Sr_{0.81}(Tb)_{0.06}Ga_2O_{3.9}$ |
| $Sr_{0.92}Tb_{0.08}Ga_4O_7$ | Elastic Recoil | $Sr_{0.6}(Tb)_xGa_4O_7$ |
| $Ca_{2.94}Eu_{0.08}Ga_2O_6$ | Elastic Recoil | $Ca_{1.68}(Eu)_xGa_2O_6$ |
| $Ca_{0.99}Eu_{0.01}Ga_2O_4$ | Elastic Recoil | $Ca_{0.99}(Eu)_xGa_2O_4$ |
| $Ba_{0.99}Eu_{0.01}Ga_2O_4$ | Elastic Recoil | $Ba_{1.0}(Eu)_xGa_2O_4$ |

Therefore what is claimed is:

1. An electroluminescent red emitting phosphor having a formulation $Ca_{1-x}Eu_xGa_yO_z$, where x is in the range from about 0.001 to about 0.1, y is from about 0.5 to about 4, and z is approximately equal to 1+(3/2)y.

2. The red emitting phosphor according to claim 1 wherein x is in the range from about 0.01 to about 0.05 and y is in the range from about 0.5 to about 4.

3. The red emitting phosphor according to claim 2 wherein said phosphor is sputtered from a source selected from the group consisting of $Ca_{0.98}Eu_{0.02}Ga_{1.33}O_3$.

4. An electroluminescent display device, comprising:
   a) a dielectric layer having a front surface, a back surface and a conducting electrode on the back surface thereof;
   b) an electroluminescent red emitting phosphor film having a formulation $Sr_{1-x}Eu_xGa_yO_z$, where x is in the range 0.001 to 0.1, y is from about 0.5 to about 12, and z is approximately 1+(3/2)y, said phosphor film deposited onto the front surface of said dielectric layer; and
   c) a substantially transparent electrode deposited onto a top surface of said phosphor, means for applying a voltage between said transparent electrode and the conducting electrode to develop a suitable electric field across said phosphor.

5. The electroluminescent display device according to claim 4 wherein said formulation of said phosphor film comprises x in the range from about 0.01 to about 0.05, and y in the range from about 0.5 to about 12.

6. The electroluminescent display device according to claim 5 wherein said phosphor film is deposited from a source material by sputtering.

7. The electroluminescent display device according to claim 6 wherein said source material has a formulation selected from the group consisting of $Sr_{0.98}Eu_{0.02}Ga_{0.67}O_2$, $Sr_{0.98}Eu_{0.02}Ga_{0.5}O_{1.75}$, $Sr_{0.98}Eu_{0.02}Ga_{0.57}O_{1.86}Sr_{0.98}Eu_{0.02}Ga_4O_7$, $Sr_{0.98}Eu_{0.02}Ga_{12}O_{19}$, $Sr_{0.98}Eu_{0.02}Ga_{1.33}O_3$.

8. An electroluminescent display device, comprising:
   a) a dielectric layer having a front surface, a back surface and a conducting electrode on the back surface thereof;
   b) an electroluminescent red emitting phosphor film having a formulation $Ba_{1-x}Eu_xGa_yO_z$, where x is in the range from about 0.001 to about 0.1, y is from about 0.5 to about 4, and z is approximately 1+(3/2)y, said phosphor film deposited onto the front surface of said dielectric layer; and
   c) a substantially transparent electrode deposited onto a top surface of said phosphor, means for applying a voltage between said transparent electrode and the conducting electrode to develop a suitable electric field across said phosphor.

9. The electroluminescent display device according to claim 8 wherein x is in the range from about 0.01 to about 0.05, y is the range from about 0.5 to about 2.

10. The electroluminescent display device according to claim 9 wherein said phosphor film is deposited from a source material by sputtering.

11. The electroluminescent display device according to claim 10 wherein said source material has a formulation selected from the group consisting of $Ba_{0.98}Eu_{0.02}Ga_{0.67}O_2$ and $Ba_{0.98}Eu_{0.02}Ga_{0.5}O_{1.75}$.

12. An electroluminescent display device, comprising:
   a) a dielectric layer having a front surface, a back surface and a conducting electrode on the back surface thereof;
   b) an electroluminescent red emitting phosphor film having a formulation $Ca_{1-x}Eu_xGa_yO_z$, where x is in the range from about 0.001 to about 0.1, y is from about 0.5 to about 4, and z is approximately equal to 1+(3/2)y, said phosphor film being deposited onto the front surface of said dielectric layer; and
   c) a substantially transparent electrode deposited onto a top surface of said phosphor, means for applying a voltage between said transparent electrode and the conducting electrode to develop a suitable electric field across said phosphor.

13. The electroluminescent display device according to claim 12 wherein x is in the range from about 0.01 to about 0.05 and y is in the range from about 0.5 to about 4.

14. The electroluminescent display device according to claim 13 wherein said phosphor film is deposited from a source material by sputtering.

15. The electroluminescent display device according to claim 15 wherein said source material has a formulation selected from the group consisting of $Ca_{0.98}Eu_{0.02}Ga_{1.33}O_3$.

16. A compound having a formula $Sr_3Ga_2O_6$:n%Eu, wherein n% is the mole percent of Eu present in $Sr_3Ga_2O_6$ and spans the range in which Eu is soluble in $Sr_3Ga_2O_6$.

17. The compound according to claim 16 wherein said compound is sputtered from a source having a composition given by $Sr_3Ga_2O_6$:2%Eu.

18. A compound having a formula $Sr_4Ga_2O_7$:n%Eu, wherein n% is the mole percent of Eu present in $Sr_4Ga_2O_7$ and spans the range in which Eu is soluble in $Sr_4Ga_2O_7$.

19. The compound according to claim 18 wherein said compound is sputtered from a source having a composition given by $Sr_4Ga_2O_7$:2%Eu.

20. A compound having a formula $Sr_7Ga_4O_{13}$:n%Eu, wherein n% is the mole percent of Eu present in $Sr_7Ga_4O_{13}$ and spans the range in which Eu is soluble in $Sr_7Ga_4O_{13}$.

21. The compound according to claim 20 wherein said compound is sputtered from a source having a composition given by $Sr_7Ga_4O_{13}$:2%Eu.

22. A compound having a formula $SrGa_4O_7$:n%Eu, wherein n% is the mole percent of Eu present in $Sr_4Ga_2O_7$ and spans the range in which Eu is soluble in $Sr_4Ga_2O_7$.

23. The compound according to claim 22 wherein said compound is sputtered from a source having a composition given by $SrGa_4O_7$:2%Eu.

24. A compound having a formula $SrGa_{12}O_{19}$:n%Eu, wherein n% is the mole percent of Eu present in $SrGa_{12}O_{19}$ and spans the range in which Eu is soluble in $SrGa_{12}O_{19}$.

25. The compound according to claim 24 wherein said compound is sputtered from a source having a composition given by $SrGa_{12}O_{19}$:2%Eu.

26. A compound having a formula $Sr_3Ga_4O_9$:n%Eu, wherein n% is the mole percent of Eu present in $Sr_3Ga_4O_9$ and spans the range in which Eu is soluble in $Sr_3Ga_4O_9$.

27. The compound according to claim 26 wherein said compound is sputtered from a source having a composition given by $Sr_3Ga_4O_9$:2%Eu.

28. A compound having a formula $Ba_3Ga_2O_6$:n%Eu, wherein n% is the mole percent of Eu present in $Ba_3Ga_2O_6$, and spans the range in which Eu is soluble in $Ba_3Ga_2O_6$.

29. The compound according to claim 28 wherein said compound is sputtered from a source having a composition given by $Ba_3Ga_2O_6$:2%Eu.

30. A compound having a formula $Ba_4Ga_2O_7$:n%Eu, wherein n% is the mole percent of Eu present in $Ba_4Ga_2O_7$, and spans the range in which Eu is soluble in $Ba_4Ga_2O_7$.

31. The compound according to claim 30 wherein said compound is sputtered from a source having a composition given by $Ba_4Ga_2O_7$:2%Eu.

* * * * *

UNITED STATES PATENT AND TRADEMARK OFFICE
CERTIFICATE OF CORRECTION

PATENT NO. : 5,788,882
DATED : August 4, 1998
INVENTOR(S) : Kitai et al.

It is certified that error appears in the above-identified patent and that said Letters Patent is hereby corrected as shown below:

Claim 7, line 5 (column 14, line 25), after the first formula "$Sr_{0.98}...O_{1.86}$", a comma, --,-- should be inserted;

Claim 15, line 2, "claim 15" should be replaced with --claim 14--;

Claim 22, lines 2 and 3, two occurrences of "$Sr_4Ga_2O_7$" should be replaced with --$SrGa_4O_7$--.

Signed and Sealed this

Second Day of February, 1999

Attest:

Attesting Officer

*Acting Commissioner of Patents and Trademarks*